United States Patent
Osada et al.

(10) Patent No.: US 6,752,111 B2
(45) Date of Patent: Jun. 22, 2004

(54) ENGINE STARTER

(75) Inventors: Masahiko Osada, Okazaki (JP); Mikio Saito, Motosu-gun (JP); Masanori Ohmi, Anjo (JP)

(73) Assignee: Denso Corporation, Kariya (JP)

( * ) Notice: Subject to any disclaimer, the term of this patent is extended or adjusted under 35 U.S.C. 154(b) by 49 days.

(21) Appl. No.: 10/231,198

(22) Filed: Aug. 30, 2002

(65) Prior Publication Data

US 2003/0070645 A1 Apr. 17, 2003

(30) Foreign Application Priority Data

Oct. 16, 2001 (JP) ........................................ 2001-318334

(51) Int. Cl.⁷ ................................................ F02N 11/00
(52) U.S. Cl. .................... 123/179.3; 290/38 R
(58) Field of Search ........................ 123/179.3; 290/38 R

(56) References Cited

U.S. PATENT DOCUMENTS 4,873,607 A  * 10/1989 Yamamoto .................. 361/210
6,323,562 B1 * 11/2001 Renner et al. ............ 290/38 A
6,634,332 B2 * 10/2003 Saito et al. ............... 123/179.3

FOREIGN PATENT DOCUMENTS

JP          A 58-51273         3/1983

* cited by examiner

Primary Examiner—Mahmoud Gimie
Assistant Examiner—Arnold Castro
(74) Attorney, Agent, or Firm—Oliff & Berridge, PLC

(57) ABSTRACT

Simplifying a control system by integrating current control for an exciting coil and a main current control for a starter motor is accomplished by a current control unit for a starter motor and is constructed with a control device provided among a battery, a motor contact point and an exciting coil, and a starter ECU for driving the control device. The control device has a device capacity for allowing main current of the starter motor. The starter ECU changes a control specification for the control device before and after closing the motor contact point. That is, control-start timing of a coil current is determined by a battery voltage before closing the motor contact point. Thereafter, the coil current is restricted to a predetermined value to reduce a moving speed of a plunger. After closing the motor contact point, the main current is slowly raised.

10 Claims, 2 Drawing Sheets

ENGINE STARTER

CROSS REFERENCE TO RELATED APPLICATION

This application is based upon, claims the benefit of priority of, and incorporates by reference the contents of prior Japanese Application No. 2001-318334 filed Oct. 16, 2001.

BACKGROUND OF THE INVENTION

1. Technical Field of the Invention

The present invention relates to an engine starter including a current control unit for controlling the current flowing in an exciting coil of an electromagnetic switch and the current flowing in a starter motor.

2. Description of Related Art

In general, when an ignition switch is turned on, an electromagnetic switch provided in a starter generates magnetic force by energizing its exciting coil, and pushes a pinion out by driving a plunger that uses the magnetic force. At this time, when the moving speed of the plunger is high, the pinion contacts a ring gear with a large impact, and its collision sound is heightened. Further, the ring gear becomes worn by repeating this contact.

In related prior art for solving the problems, current flowing into the exciting coil is restricted through a control device connected in series to the exciting coil, thereby reducing the moving speed of the plunger. Further, the main current, that is, the current flowing into the starter motor, is controlled to control characteristics of the starter motor. However, since the main current for the starter motor is much larger than the current flowing into the exciting coil, it is extremely difficult to control the main current using the control device for controlling the current of the exciting coil. Therefore, a control device, different from the control device for controlling the current of the exciting coil, needs to be newly created and provided to control the main current. Further, both control devices need to be controlled by different control circuits, respectively.

As described above, if not only the current control for the exciting coil, but also the main-current control for the starter motor are performed, a control system is complicated, and production costs are largely increased.

SUMMARY OF THE INVENTION

The present invention has been made in view of the above problems, and it is an object of the present invention to provide an engine starter with a control system that can be simplified by integrating current control for an exciting coil and integrating main current control for a starter motor.

An engine starter according to a first aspect of the present invention includes a control device provided among a battery, a motor contact point and an exciting coil, and a current control unit for controlling current (coil current) flowing into the exciting coil and current (main current) flowing into a starter motor using the control device. The current control unit changes a control specification for the control device between before and after closing the motor contact point.

Since the present invention uses a control device capable of allowing the main current, a common current control unit can control the coil current and the main current. As a result, a control system can be simplified compared to a case where the coil current and the main current are controlled by separated control devices, respectively.

In the engine starter according to a second aspect of the invention, the current control unit restricts current flowing into the exciting coil to a predetermined value using the control device to reduce the moving speed of the plunger after starting energization of the exciting coil. As soon as the contact-point detecting device detects the closed state of the motor contact point, current control is released for the exciting coil, and a current flowing into the starter motor is gradually increased using the control device to restrict a rush current flowing into the starter motor.

According to this construction, since the moving speed of the plunger is reduced by restricting the coil current to the predetermined value, the moving speed of the pushed pinion can be reduced while interlocked with movement of the plunger. As a result, impact force, generated when the pinion contacts a ring gear, is reduced, thereby reducing impact noise, and restricting wear of the gear, edges of the gear and the like.

Further, when the moving speed of the plunger is reduced, bounce of a movable contact point, provided on the plunger, is reduced. This restricts an arc current due to the bounce, and prevents the motor contact point and the movable contact point from melting and adhering to each other. After closing the motor contact point, since a rush current can be prevented by slowly raising the main current, the brush can be prevented from premature wear.

In the engine starter according to the above second aspect, the current control unit performs pulse width modulation control (PWM control) for a voltage output from a battery by turning the control device on and off. Furthermore, the current control unit switches any one of a current control for the exciting coil and a current control for the starter motor by changing a specification of the PWM control. Accordingly, according to a third aspect of the invention, the coil current and the main current can be controlled by controlling a voltage between terminals of the exciting coil and a voltage between terminals of the starter motor, respectively.

In the engine starter according to the above second and third aspects, the current control unit determines current-control start timing using a battery voltage. When the plunger is driven, the entire voltage is applied to the exciting coil at first. However, when the battery voltage is high, a transient build-up speed of the plunger becomes high. Therefore, the time that the voltage is applied is changed in accordance with the battery voltage, thereby suitably controlling the moving speed of the plunger.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
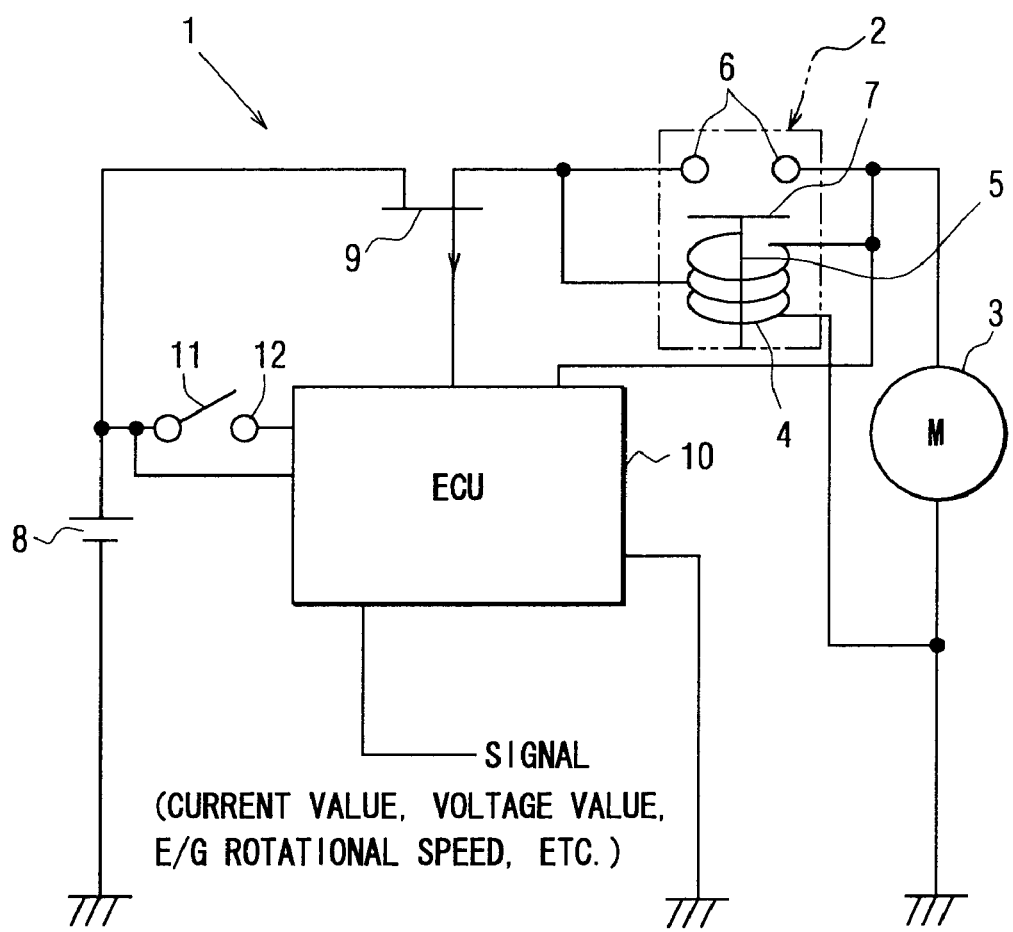
FIG. 1 is a circuit diagram showing an engine starter.

FIG. 1 is an electric circuit diagram showing an engine starter 1. The engine starter 1 according to the present embodiment includes a pinion-entering type starter (described later) having an electromagnetic switch 2, and a current control unit (described later) for controlling a coil current of the electromagnetic switch 2 and a main current of a starter motor 3.

The starter includes the electromagnetic switch 2, the starter motor 3 and a push mechanism (not shown). The electromagnetic switch 2 closes a motor contact point 6 by driving a plunger 5 using a magnetic force generated by an exciting coil 4. The starter motor 3 is energized by closing the motor contact point 6, and generates a rotational force. The push mechanism pushes a pinion interlocked with movement of the plunger 5. The rotational force of the starter motor 3 is transmitted to a ring gear (not shown) of an engine through the pushed pinion (not shown) by making the pushed pinion engage the ring gear, thereby starting the engine. The motor contact point 6 is provided in a circuit for energizing the starter motor 3, and is opened and closed by a movable contact point 7 provided on the plunger 5.

As shown in FIG. 1, the control unit is constructed by a battery 8, a control device (switching device) 9 provided between the motor contact point 6 and the exciting coil 4, and a starter ECU 10 for driving the control device 9. The control device 9 is a switching device such as transistor, and has a device capacity for allowing a main current to flow into the starter motor 3.

When an ignition (IG) key 11 is switched to an ST terminal 12, the starter ECU 10, energized from the battery 8, is started, and performs pulse width modulation control (PWM control) for a voltage output from the battery 8 by turning the control device 9 on and off.

For example, when a vehicle is stopped at an intersection and the like, the engine starter 1 according to the present embodiment stops the engine once. Thereafter, when a predetermined starting condition is satisfied, the engine starter 1 can again automatically start the engine. In this case, when a start signal is input to the starter ECU 10 in a condition where the engine is stopped (here, the IG key 11 is switched to the ST terminal 12), the starter ECU 10 starts the engine by driving the control device 9.

Figure 2:
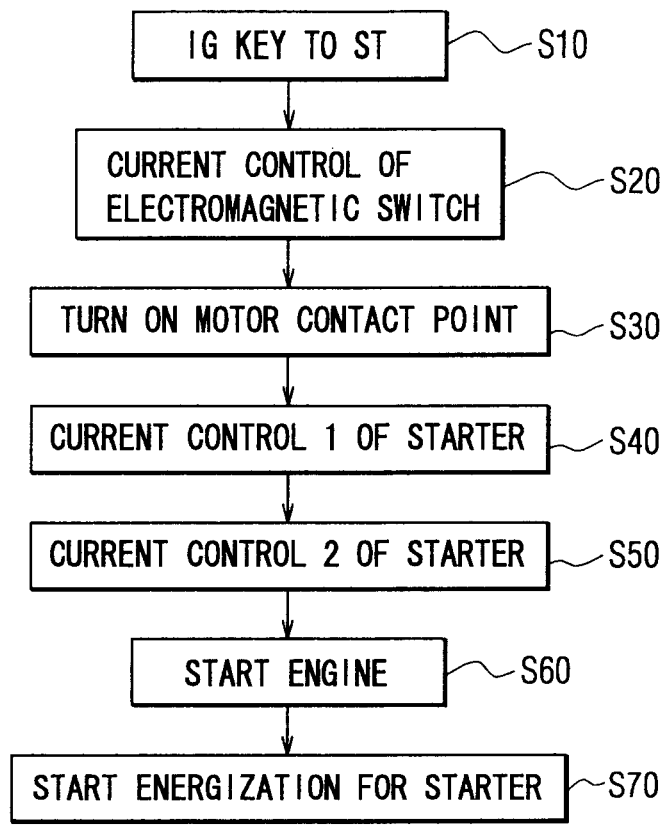
FIG. 2 is a flow diagram showing operation steps of the engine starter.
Figure 3:
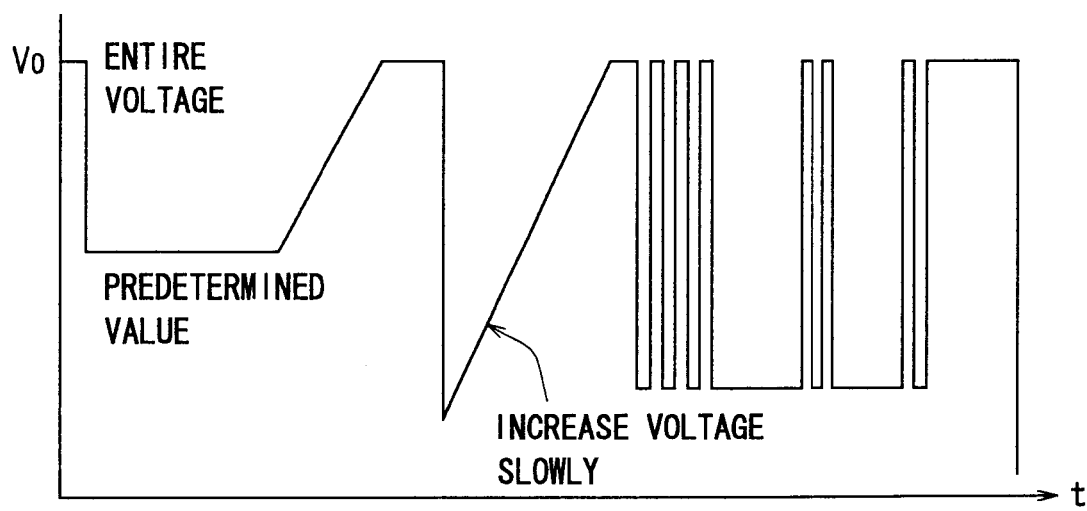
FIG. 3 is a wave graph of a battery voltage showing an example of PWM (pulse width modulation) control.

Next, operation of the engine starter 1 will be described with reference to the flow diagram shown in FIG. 2. At step 10, when the IG key 11 is switched to the ST terminal 12 (or the start signal is input to the starter ECU 10), the starter ECU 10 starts the engine start control by driving the control device 9. At step 20, coil current of the electromagnetic switch 2 is controlled. Specifically, control-start timing of the coil current (i.e., entire voltage applying timing) is determined by a battery voltage, and a voltage applied between terminals of the exciting coil 4 is restricted to reduce the coil current to a predetermined value so that a moving speed of the plunger 5 becomes lower (refer to FIG. 3). At step 30, the movable contact point 7 provided on the plunger 5 contacts the motor contact point 6 of the electromagnetic switch 2 to turn on the motor contact point 6. At step 40, the main current, that is, the transient build-up current of the starter motor 3 is controlled.

After the motor contact point 6 is turned on, the exciting coil 4 can be energized only by a current for maintaining the contact state of the plunger 5 to the motor contact point 6, thereby changing the control specification for the control device 9. Here, the voltage applied between the terminals of the starter motor 3 is gradually increased so that the main current rises slowly (refer to FIG. 3).

The starter ECU 10 inputs a signal from a contact-point detecting device (not shown) for detecting an ON state of the motor contact point 6, and switches coil-current control to a main-current control. For example, the contact-point detecting device detects a current value or a voltage value at a downstream location relative to the motor contact point 6, and outputs the detected value to the control circuit as an electric signal. Otherwise, the contact-point detecting device can detect an ON state of the motor contact point 6 using a rotational speed of the engine without the current value and the voltage value.

At step 50, the main current (post build-up current) of the starter motor 3 is controlled. Here, the main current is controlled to obtain the most suitable rotational speed of the starter motor 3 for starting the engine. At step 60, the rotational force of the starter motor 3 is transmitted to the pinion engaged with the ring gear, thereby starting the engine. At step 70, after it is checked to start the engine, the control device 9 is turned off to stop energization of the starter.

Since the engine starter 1 described above uses the control device 9 for allowing the main current, the engine starter 1 can perform coil-current control and main-current control using control device 9, that is, a single control device. As a result, since the starter ECU 10 for driving the control device 9, that is, a single starter ECU can be allowed, the control system can be simplified, and production costs can be reduced.

In the coil-current control, since the control start timing can be controlled in accordance with the battery voltage, the moving speed of the plunger 5 can be suitably controlled in consideration of a transient build-up moving speed of the plunger 5. After control is started, the moving speed of the plunger 5 is reduced by restricting the coil current to a predetermined value, and the moving speed of the pinion, which is pushed while interlocked with the movement of the plunger 5, is reduced. As a result, impact force, generated when the pinion contacts the ring gear, is reduced, thereby reducing impact sounds, and restricting wear of the gear, edges of the gear, and the like.

When the moving speed of the plunger 5 is reduced, bounce of the movable contact point 7 provided on the plunger 5 is reduced, thereby restricting an arc current due to the bounce, and preventing the motor contact point 6 and the movable contact point 7 from melting and adhering to each other. In the main-current control, since a rush current can be prevented by slowly raising the main current, a large current does not flow into a brush, and the brush can be restricted from being rapidly worn.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An engine starter comprising:
   an electromagnetic switch including:
      a motor contact point;
      a plunger; and
      an exciting coil, wherein the motor contact point is closed by activating the plunger using electromagnetic force generated by the exciting coil;

a starter motor energized by closing the motor contact point, for generating rotational force;

a contact-point detecting device for detecting a closed state of the motor contact point;

a control device provided among a battery, the motor contact point and the exciting coil;

a current control unit,
  wherein the current control unit controls current flowing into the exciting coil and current flowing into the starter motor using the control device, and
  wherein the current control unit changes a control specification for the control device before and after closing of the motor contact point; and a pinion, wherein the pinion is pushed out while interlocked with movement of the plunger and is engaged with a ring gear of an engine, to start the engine by transmitting a rotational force of the starter motor from the pinion to the ring gear.

2. The engine starter according to claim 1, wherein:

the current control unit restricts current flowing into the exciting coil to a predetermined value using the control device to reduce a moving speed of the plunger after starting energization of the exciting coil; and as soon as the contact-point detecting device detects the closed state of the motor contact point, the current control is released for the exciting coil, and a current flowing into the starter motor is gradually increased using the control device to prevent a rush current from flowing into the starter motor.

3. The engine starter according to claim 2, wherein:

the current control unit performs pulse width modulation control for a battery output voltage by turning the control device on and off; and the current control unit switches any one of a current control for the exciting coil and a current control for the starter motor by changing specification of the PWM control.

4. The engine starter according to claim 2, wherein the current control unit determines current control start timing using a battery voltage.

5. The engine starter according to claim 3, wherein the current control unit determines current control start timing using a battery voltage.

6. A method of controlling the starting of an engine comprising the steps of:

closing a motor contact point by driving a plunger of an electromagnetic switch using an electromagnetic force generated by an exciting coil;

detecting a closed state of the motor contact point using a contact point detecting device;

providing a control device among a battery, an exciting coil, and the motor contact point;

controlling, with a current control unit, a current flowing into the exciting coil and a current flowing into a starter motor;

starting the engine by driving a pinion interlocking the plunger, the pinion engaging an engine ring gear; and changing a control specification for the control device, using the current control unit, before and after closing the motor contact point.

7. The method of controlling the starting of an engine according to claim 6, further comprising the step of:

restricting the current flowing into the exciting coil to a predetermined value to reduce a speed of the plunger after energization of the exciting coil.

8. The method of controlling the starting of an engine according to claim 7, further comprising the steps of:

detecting a closed state of the motor contact point;

releasing current control of the exciting coil; and gradually increasing current flowing into the starter motor using the control device to prevent a surge of current flowing into the starter motor.

9. The method of controlling the starting of an engine according to claim 8, further comprising the steps of:

performing pulse width modulation control for a voltage output from the battery by turning the control device on and off; and switching current control for the exciting coil by changing a specification of the pulse width modulation control.

10. The method of controlling the starting of an engine according to claim 7, further comprising the step of:

determining current control start timing using a battery voltage.

* * * * *